United States Patent [19]
January

[11] Patent Number: 5,724,128
[45] Date of Patent: Mar. 3, 1998

[54] APPARATUS AND METHOD FOR DETERMINING VEHICLE WHEEL ALIGNMENT MEASUREMENTS FROM THREE DIMENSIONAL WHEEL POSITIONS AND ORIENTATIONS

[75] Inventor: Daniel B. January, St. Peters, Mo.

[73] Assignee: Hunter Engineering Company, Bridgeton, Mo.

[21] Appl. No.: 580,465

[22] Filed: Dec. 28, 1995

[51] Int. Cl.$^6$ .................................................. G01B 11/275
[52] U.S. Cl. .................. 356/139.09; 356/155; 33/288; 33/203.18
[58] Field of Search .................. 356/155, 139.09; 33/288, 203.18

[56] References Cited

U.S. PATENT DOCUMENTS

| | | | |
|---|---|---|---|
| Re. 33,144 | 1/1990 | Hunter et al. | 356/152 |
| 4,319,838 | 3/1982 | Grossman et al. | 356/152 |
| 4,745,469 | 5/1988 | Waldecker et al. | 358/93 |
| 4,879,670 | 11/1989 | Colarelli, III | 364/559 |
| 4,889,425 | 12/1989 | Edwards et al. | 356/152 |
| 4,899,218 | 2/1990 | Waldecker et al. | 358/93 |
| 5,532,816 | 7/1996 | Span et al. | 356/139.09 |
| 5,535,522 | 7/1996 | Jackson | 33/288 |

FOREIGN PATENT DOCUMENTS

| | | |
|---|---|---|
| 2948573 | 6/1981 | Germany . |
| 9405969 | 3/1994 | WIPO . |

OTHER PUBLICATIONS

Daniel B. January, SAE Technical Paper Series, Steering Geometry and Caster Measurement Feb. 25–Mar. 1, 1985.

*Primary Examiner*—Mark Hellner
*Attorney, Agent, or Firm*—Polster, Lieder, Woodruff & Lucchesi, L.C.

[57] ABSTRACT

Apparatus and method for determining the alignment positions and orientations of vehicle wheels includes optical targets mounted on the wheels and optical targets mounted in a fixed relationship with respect to the surface on which the wheels are disposed. Video cameras are used to obtain images of the various optical targets and a computer is responsive to the images of the targets to determine values of wheel alignment parameters of the vehicle relative to said surface on which the vehicle wheels roll. Methods of calibrating such an apparatus and methods using such apparatus to determine the flatness of the surface on which the wheels roll are also disclosed.

33 Claims, 9 Drawing Sheets

APPARATUS AND METHOD FOR DETERMINING VEHICLE WHEEL ALIGNMENT MEASUREMENTS FROM THREE DIMENSIONAL WHEEL POSITIONS AND ORIENTATIONS

BACKGROUND OF THE INVENTION

The present invention relates to vehicle wheel alignment, and more particularly to vehicle wheel alignment systems which measure the locations and orientations of the vehicle wheels in a three dimensional coordinate system.

Various systems have been designed to determine vehicle wheel alignment angles. For example, U.S. Pat. No. Re33,144 to Hunter and January and U.S. Pat. No. 4,319,838 to Grossman and January each describe a wheel alignment system which uses electro-optical transducers to determine the toe alignment angles of a vehicle. FIG. 2 of each of these patents shows six angle transducers carried by support assemblies which are mounted to the vehicle wheels. FIG. 4 of U.S. Pat. No. Re33,144 and FIG. 9 of U.S. Pat. No. 4,319,838 show the geometry of this arrangement and illustrate the six angles which are directly measured. These patents further describe (see U.S. Pat. No. Re33,144 col. 7 lines 26–39, and U.S. Pat. No. 4,319,838 col. 8 line 63 to col. 9 line 12) how the toe alignment angles are computed from the angles directly measured by the angle transducers.

U.S. Pat. No. 4,879,670 to Colarelli describes a gravity-referenced inclinometer. FIG. 3 of U.S. Pat. No. 4,879,670 illustrates the mounting of such an inclinometer to a vehicle wheel for measuring the camber of the wheel. The use of gravity-referenced inclinometers to measure camber is conventional, and assumes the vehicle rests while being measured on a surface which is both flat and level.

SAE Publication 850219, titled "Steering Geometry and Caster Measurement", by January, derives and discusses the procedures and methods by which toe and camber alignment transducers are used to determine the caster and steering axis inclination (SAI) of a vehicle. The procedures described therein are the industry standard.

Equipment of this general type and using the apparatus and methods enumerated above has been used world-wide for many years. Such equipment is capable of determining the camber, caster, and pointing or "toe" alignment angles of the wheels relative to one or more appropriate reference axes, and is sufficient to allow proper adjustment of the alignment so as to reduce tire wear and provide for safe handling. It is believed, however, that such equipment could be improved.

U.S. patent application Ser. No. 08/371,007 to January advances the art further by describing the use of conventional toe transducers which, while operating in cooperative pairs, have the additional capability of measuring the distances, each relative to the other. FIG. 7 of application Ser. No. 08/371,007 illustrates the use of these "range and bearing" measurements to determine the coordinates and orientations of the sensors and wheels in a two dimensional coordinate system.

FIGS. 8 through 11 of application Ser. No. 08/371,007 illustrate the seriousness of the central problem in measuring the individual toe alignments of vehicle wheels, namely that individual toe of a vehicle wheel is defined to be relative to a longitudinal reference axis, but the definition of that reference axis may not be arbitrarily chosen by the designer of such equipment. In general, two such reference axes are used, the definitions of which were standardized long ago in the automotive service industry.

The individual rear toe alignment angles are defined to be relative to a reference axis commonly known as the "geometric centerline". This line, illustrated and labeled "CL" in FIG. 9B of application Ser. No. 08/371,007, is practically determined as the bisector of the angle formed by the longitudinal lines of sight of the toe transducers. These lines of sight are illustrated and labeled 48 and 50 in FIG. 6 of application Ser. No. 08/371,007. A key aspect of this definition is that the forward endpoints of these longitudinal lines of sight are remarkably insensitive to small changes in the steering directions of the from wheels, which means that the individual rear toe alignment measurements are similarly insensitive to the steering of the front wheels.

The layman's definition of the geometric centerline is the line joining two points, one lying halfway between the front wheels and the other lying halfway between the rear wheels. This line very closely approximates the centerline described above and is very easy to visualize.

The individual front toe alignment angles are defined to be relative to a reference axis commonly known as the "thrust line". This line, illustrated and labeled "TL" in FIG. 9A of application Ser. No. 08/371,007, is practically determined as the bisector of the angle formed by the reference axes of the rear longitudinal toe transducers. These reference axes are illustrated and labeled 59 and 60 in FIG. 9A of application Ser. No. 08/371,007. A key aspect of this definition is that the thrust line is determined as the net pointing direction of the rear wheels, which means that the individual front toe alignment measurements are intentionally sensitive to the toe alignment of the rear wheels.

The layman's definition of the thrust line is the line which bisects the angle formed by the planes of rotation of the rear wheels. This line is very easy to visualize.

There are great practical advantages in determining toe alignment relative to these reference axes. Firstly, the toe adjustment of the rear wheels can be accomplished with the front wheels steered only approximately straight ahead. Secondly, the thrust line thus determined is approximately the line down which the center of the rear axle travels when the vehicle moves in a straight line, and this line is made to point approximately down the centers of the front and rear axles. Thirdly, the toe adjustment of the front wheels can be accomplished with the steering wheel held straight such that the front toe measurements are symmetric about the thrust line, thereby insuring that the steering wheel is straight when the vehicle moves in a straight line. Fourthly, vehicle manufacturers have long provided toe alignment specifications which are relative to these reference axes. Any vehicle alignment system which defines toe alignment relative to other axes will not be able to correctly align the vehicle as specified by the vehicle manufacturers.

The disclosure of application Ser. No. 08/371,007 illustrates that determining the two dimensional coordinates of the vehicle wheels does not provide greater ability to determine the toe alignments of the wheels relative to the appropriate reference axes of the vehicle. The only determinations of these reference axes which are practical to use are the same as those provided by transducers which measure angles but do not additionally measure distances.

U.S. Pat. Nos. 4,745,469 and 4,899,218, both to Waldecker et al., describe what is commonly known as an "external reference aligner". U.S. Pat. No. 4,899,218 is a continuation of U.S. Pat. No. 4,745,469, and contains no new disclosure. FIGS. 3 through 6 of these patents show how lasers are used to illuminate the tires and video cameras are used to examine images of the sidewalls. These patents further describe how "machine vision techniques" are used to examine the images and determine the distances between the cameras and certain locations on the sidewalls, thereby allowing a determination of the locations and orientations of the wheels in a coordinate system which is relative to the cameras.

Unfortunately, both patents, U.S. Pat. Nos. 4,745,469 and 4,899,218 are woefully deficient in describing how a determination is made of the toe alignment of the wheels relative to the appropriate reference axes of the vehicle. The need for this is discussed in U.S. Pat. No. 4,745,469, col. 2, lines 19–24:

"This wheel position information can be combined with similarly measured data defining the vehicle center line or other desired references and the complete vehicle alignment geometry can be analyzed and dynamically displayed on a meter or the like to guide an operator in adjusting or setting the wheel alignment."

Beyond this, U.S. Pat. No. 4,745,469 has no disclosure of how the toe measurements are determined relative to the vehicle center line. A reference line L is defined in FIG. 2 and discussed in col. 4, lines 13–23:

"The spatial position of the wheel ... may be defined in relation to ... a longitudinal line L which passes through two fixed points on the vehicle. For convenience, longitudinal line L is shown extending through the front and rear bolts 24 and 26 which attach the control arm to the vehicle chassis ... In FIG. 1, a second longitudinal line L' is drawn parallel to longitudinal line L so that it passes through wheel axis A. The angle between longitudinal line L' and the center plane C establishes the toe-in of the wheel."

This is not believed to be a useful definition for a reference axis for determining toe alignment. Firstly, not all vehicles have an upper control arm with mounting bolts as described. Secondly, vehicles which have such upper control arms have one for the left front wheel and one for the right front wheel, and thus would have two different such lines L, even though left front toe and right front toe should be determined relative to the same reference axis. Thirdly, vehicles which mount an upper control arm in the manner illustrated in FIG. 2 of U.S. Pat. No. 4,745,469 commonly use shims, eccentric cams, or elongated slots to move these mounting bolts, thereby adjusting camber and/or caster of the affected wheel. Fourthly, no vehicle manufacturer specifies toe alignment relative to such an axis.

U.S. Pat. No. 4,745,469 describes determining the toe alignment of a wheel in yet another way in col. 16, lines 10–25:

"Once two points in real space have been found, corresponding to two points along a horizontal line on the tire, the toe-in is easily computed using trigonometry. Referring to FIG. 21, the left and right sensor modules 36 are illustrated together with a portion of the tire 12. Each sensor is a predetermined distance from a reference point REF. The distances are designed $Y_L$ and $Y_R$. The spacing between the left and right data points $P_L$ and $P_R$ is therefore $Y_L+Y_R$. The real space position of points $P_L$ and $P_R$ in the Z direction are the measured values $Z_L$ and $Z_R$ determined by the conversion from image space data to real space data. If the points $P_L$ and $P_R$ do not have the same Z coordinates, then there is a non-zero toe angle. This angle is determined by trigonometry as the arc tangent of the difference $(Z_R-Z_L)$ divided by the sum $(Y_R+Y_L)$."

This definition would have individual toe measured relative to the video cameras, which would provide the proper value only if the vehicle were squarely aligned relative to the cameras, which is highly impractical.

It is readily apparent from U.S. Pat. Nos. 4,745,469 and 4,899,218, in light of application Ser. No. 08/371,007, that it is not sufficient merely to determine the locations and orientations of the vehicle wheels in a three dimensional coordinate system. Proper attention must be paid to determining the toe alignment of the wheels relative to the appropriate reference axes.

German Patent DE 29 48 573 A1, assigned to Siemens A. G., describes the use of video cameras to determine the locations and orientations of the wheels of a vehicle. On each side of the vehicle, a single camera is moved to multiple positions to view the vehicle wheels. Alternatively, a single fixed camera is used at each side in conjunction with movable mirrors, or multiple cameras are used. The system examines the images thus viewed of the wheels of the vehicle to determine the locations and orientations of the wheels, from which the wheel alignment parameters are determined.

This patent provides scant details concerning how the wheel alignment parameters are determined from measurements made by the video cameras. For example "These parameters are given essentially by the spatial position of the wheel suspension (steering axle) relative to the wheel plane or to vertical or horizontal reference planes."

and

"... the spatial positions of the wheel plane and of the steering axle and, from the appropriate data as well as the stored positional data of the video camera tube and the wheel dimensions, the wheel axle and steering geometry data are determined electronically on the basis of consecutively obtained measurement results, taking into consideration known mathematical relationships."

and

"Because of the conical section geometry as well as the circle-ellipse affinity, the axis of the body of rotation and, with that, the spatial axis of the wheel suspension, that is, the steering axis as well as the spatial position of the wheel plane, can be determined from the different positions of the wheel and the data of the wheel axles and the steering geometry calculated from the mutual allocation or the allocation to the vertical or horizontal reference planes."

This disclosure also fails to describe how individual toe alignment measurements are determined from the wheel position data. Note that this patent application was filed Dec. 3, 1979, a time when four wheel vehicle alignment embodying thrust line alignment of the rear wheels was in its relative infancy.

European Patent Application PCT/US93/08333, filed in the name of Jackson and published under the Patent Cooperation Treaty as WO 94/05969 (hereinafter referred to as WO document 94/05969), describes the use of a video camera having one or more defined fields of view to view optical targets of known configurations which are mounted to the vehicle wheels. Through the use of sophisticated image recognition methods, the three dimensional coordinates and orientations of the vehicle wheels and their corresponding axes of rotation are determined. The wheel alignment parameters are determined from these coordinates and orientations.

This application treats the determination of individual toe alignment and individual camber alignment sketchily. See, for example, page 7, lines 28–34:

" . . . the processor relates the dimensions of certain known geometric elements of the target with the dimensions of corresponding elements in the perspective image and by performing certain trigonometric calculations (or by any other suitable mathematical or numerical methods), calculates the alignment of the wheels of the vehicle."

See also page 25, lines 1–4:

"As has been described above, once the location of the target planes on the wheels is known, by rotating the wheels, the axis of rotation of the wheels can be determined, and from there, the alignment of the wheels."

A hint as to how this is performed is found on page 40, lines 2–8:

"So, for example, the apparatus could define a reference point for each wheel with the referent point being located at, say, the intersection of the axis of rotation of the wheel, with that wheel. These points can then be processed to define an approximately horizontal reference plane, relative to which the alignment of the wheels can be calculated."

Although there is considerable disclosure in the WO document 94/05969 concerning how to determine the coordinates and orientations of the wheels and their axes of rotation in a three dimensional coordinate system, there is no disclosure which explains how the toe alignment or camber alignment is determined from those coordinates and orientations. As has been made clear above, this is not a trivial subject.

There is further a fundamental flaw in this methodology. Quite simply, the three-dimensional coordinates of the vehicle wheels, and the axes about which they rotate, are not sufficient to properly determine the wheel alignment parameters of the vehicle unless the plane representing the surface on which the wheels roll is also known in that coordinate system. Firstly, the camber, caster, SAI, and toe alignment parameters of the wheels are defined relative to this plane. Secondly, the WO document 94/05969 does not provide any method or apparatus for determining where this plane is in its coordinate system, even in the most general terms. The subject is not discussed therein. As will be made more apparent presently, handling, tire wear, stability, and safety issues are compromised thereby.

There exists a clear need for apparatus and methods which allow a proper determination of the alignment of the vehicle wheels, per their conventional and accepted definitions, using measurements of the three dimensional coordinates of the vehicle wheels, the axes about which they rotate, and the plane on which they roll. This need is met by the present invention.

SUMMARY OF THE INVENTION

Among the various objects and features of the present invention may be noted the provision of an improved wheel alignment system which determines the camber, caster, toe, and other alignment parameters of the vehicle wheels, relative to the surface on which the wheels roll, per their conventional and accepted industry definitions.

A second object is the provision of such a system which determines the alignment parameters of the vehicle wheels from measurements of the coordinates and orientations of the wheels and their corresponding axes of rotation in a three dimensional coordinate system, as the alignment relates to the flat surface on which the wheels roll.

A third object is the provision of method and apparatus for calibrating such a system so that the measurements thus determined are accurate.

A fourth object is the provision of method and apparatus for checking the calibration of such a system during normal operation so that the measurements thus determined are trustworthy.

Other objects and features will be in part apparent and in part pointed out hereinafter.

Briefly, in a first aspect of the present invention, a wheel alignment apparatus for determining the alignment of the wheels of a vehicle in relation to the surface on which the vehicle wheels roll includes a first set of predetermined optical targets adapted to be mounted one to each of the wheels of a vehicle, and a second set of predetermined optical targets disposed in a predetermined geometrical relationship with respect to the surface on which said vehicle wheels roll. At least one video camera is disposed to receive images of said first optical targets and said second optical targets. A computer is operatively connected to said at least one camera, said computer being responsive to the images of said first set of targets and to the images of said second set of targets to determine values of wheel alignment parameters of the vehicle relative to said surface on which said vehicle wheels roll.

In a second aspect of the present invention, a method of calibrating wheel alignment apparatus having first and second fields of view includes the steps of disposing a first optical target in the first field of view and disposing a second optical target in the second field of view, said first and second optical targets being fixed with respect to each other, obtaining a first image of the first optical target in the first field of view and obtaining a first image of the second optical target in the second field of view, and changing the orientation of the first optical target in the first field of view to a new orientation and changing the orientation of the second optical target in the second field of view to a new orientation without changing the orientation of the first and second optical targets with respect to each other. A second image of the first optical target in the first field of view is obtained at the new orientation as is a second image of the second optical target in the second field of view at the new orientation. From said images the relative alignment of the first field of view relative to the second field of view is determined.

In a third aspect of the present invention a method for calibrating wheel alignment apparatus includes the steps of providing a first video camera having a first field of view and a second video camera having a second field of view, providing a first fixture arranged so as to rigidly align said first field of view with said second field of view, and providing a first and second calibration optical target such that said first and second calibration targets are rigidly joined together by a second fixture such that said first calibration optical target is at a first orientation in said first field of view while said second calibration optical target is at a first orientation in said second field of view. A first set of coordinates and orientation of said first calibration optical targets is determined in a first three dimensional coordinate system from the image formed of said first calibration optical target by said first video camera. Similarly, a first set of coordinates and orientation of said second calibration optical targets in a second three dimensional coordinate system is also determined from the image formed of said second calibration optical target by said second video camera. The first and second calibration targets are rotated along with said second fixture about an axis through at least a partial revolution such that said first calibration optical target lies at a second orientation within said first field of view and such that said second calibration optical target lies at a second orientation within said second field of view. Then a second set of coordinates and orientation of said first calibration optical targets in a first three dimensional coordinate system is determined from the image formed of said first calibration optical target by said first video camera. Likewise, a second set of coordinates and orientation of said second calibration optical targets in a second three dimensional coordinate system is determined from the image formed of said second calibration optical target by said second video camera. The relative alignment of said first field of view relative to said second field of view is then determined from said first and second sets of coordinates and orientations of said first calibration target and from said first and second sets of coordinates and orientations of said second calibration targets.

In a fourth aspect of the present invention, a method for measuring the relative alignment of the runways of an automotive lift rack used for measuring the alignment of vehicle wheels includes the steps of disposing at least first and second predetermined optical targets along a first runway of the automotive lift rack, disposing at least third and fourth predetermined optical targets along a second runway of the automotive lift rack, obtaining images of said first, second, third and fourth optical targets, determining from the images of the first, second and third optical targets a plane which contains said first, second and third optical targets, and determining from the image of the fourth optical target the shortest distance between said fourth target and the plane defined by the other three targets, said distance being a measure of the relative alignment of the first and second runways.

In a fifth aspect of the present invention, a method for measuring the relative alignment of the runways of an automotive lift rack used for measuring the alignment of vehicle wheels includes the steps of providing a first set of at least two optical targets of predetermined configuration and appearance mounted to one runway of a lift rack so as to represent the surface of said one runway on which the corresponding wheels of a vehicle rolls, providing a second set of at least two optical targets of predetermined configuration and appearance mounted to the other runway of a lift rack so as to represent the surface of said other runway on which the corresponding wheels of a vehicle rolls, providing a first video camera arranged so as to be able to view said first optical targets, providing a second video camera arranged so as to be able to view said second optical targets, providing a computer being operatively connected to said first and said second camera, said computer being responsive to the viewed images of said first set of targets to determine the coordinates and orientations of said first set of targets in a three dimensional coordinate system, said computer also being responsive to the viewed images of said second set of targets to determine the coordinates of said second set of targets in said three dimensional coordinate system, and determining a plane from two optical targets of said first set of optical targets and one optical target of said second set of optical targets. The distance between said plane and another optical target of said second set of optical targets is determined and displayed.

In a sixth aspect of the present invention, a wheel alignment apparatus for determining vehicle wheel alignment parameters includes a set of wheel orientation responsive units, each wheel orientation responsive unit being adapted to be attached to a wheel of a vehicle, there being one unit per vehicle wheel, and a set of surface orientation responsive units, each surface orientation responsive unit being adapted to be mounted in a predetermined geometrical relationship with respect to a surface upon which the wheels of said vehicle are disposed. A computer is operatively connected to the wheel orientation responsive units and to the surface orientation responsive units to determine wheel alignment parameters of the vehicle relative to the orientation of the surface upon which the vehicle wheels are disposed.

BRIEF DESCRIPTION OF THE DRAWINGS

Similar reference characters indicate similar parts throughout the several views of the drawings.

DETAILED DESCRIPTION OF THE PREFERRED EMBODIMENT

It is preferred that the present invention be embodied in a computer controlled vehicle wheel alignment system, as is usual and customary in the art. Most modern wheel alignment systems are built using an off-the-shelf IBM compatible personal computer (PC) which is connected to the requisite alignment sensors through the built-in serial ports of the PC or through custom designed hardware.

As will be discussed in more detail presently, the sensors of the present invention consist of a pair of video cameras which are made to view optical targets mounted to the vehicle wheels. This is very similar to WO document 94/05969 (discussed previously), the full disclosure of which is incorporated herein by reference.

Figure 1:
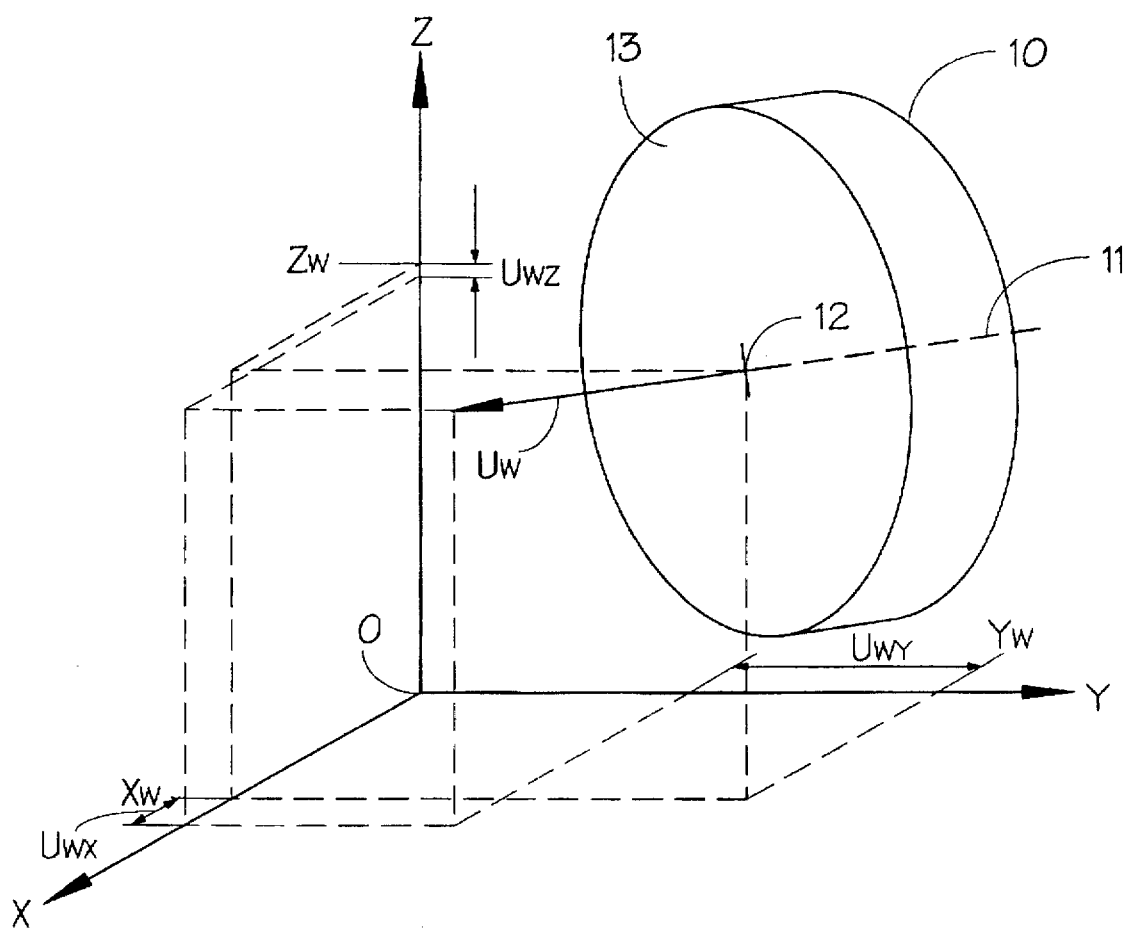
FIG. 1 is an isometric view of a vehicle wheel, showing how the location and orientation of the wheel and its axis of rotation are represented in a three dimensional coordinate system.

FIG. 1 illustrates the purpose of the video cameras, which is to determine the coordinates and orientations of the vehicle wheels, and the axes about which they roll, in a three dimensional coordinate system. In FIG. 1, a vehicle wheel 10 rotates about its axis of rotation 11. The location 12 of the wheel 10 is defined to be the intersection of the axis of rotation 11 with the plane of rotation 13 which represents the wheel. This plane of rotation 13 is most conveniently visualized as the approximate outer edge of the wheel rim, and is perpendicular to the axis of rotation 11.

The location of the wheel 10 is described by the coordinates $X_W$, $Y_W$, and $Z_W$ in a three dimension coordinate system having orthogonal axes X, Y, and Z. The orientation of the wheel 10 is described by the unit vector $U_W$, which points from the location 12 of the wheel 10 outwardly along the axis of rotation 11, and by the plane of rotation 13.

Vector $U_W$ may be represented in many forms. Perhaps the most convenient are in terms of its "direction numbers", which are the distances along the axes $X_W$, $Y_W$, and $Z_W$ between its starting and ending point. The direction numbers for $U_W$ are shown in FIG. 1 as $U_{WX}$, $U_{WX}$, and $U_{WZ}$. A second convenient representation of the direction of $U_W$ are in terms of its "direction cosines", which are the ratios of the direction numbers to the vector length, which is conveniently equal to one for a unit vector. A third convenient representation is an equation describing the plane of rotation of the wheel.

Figure 2:
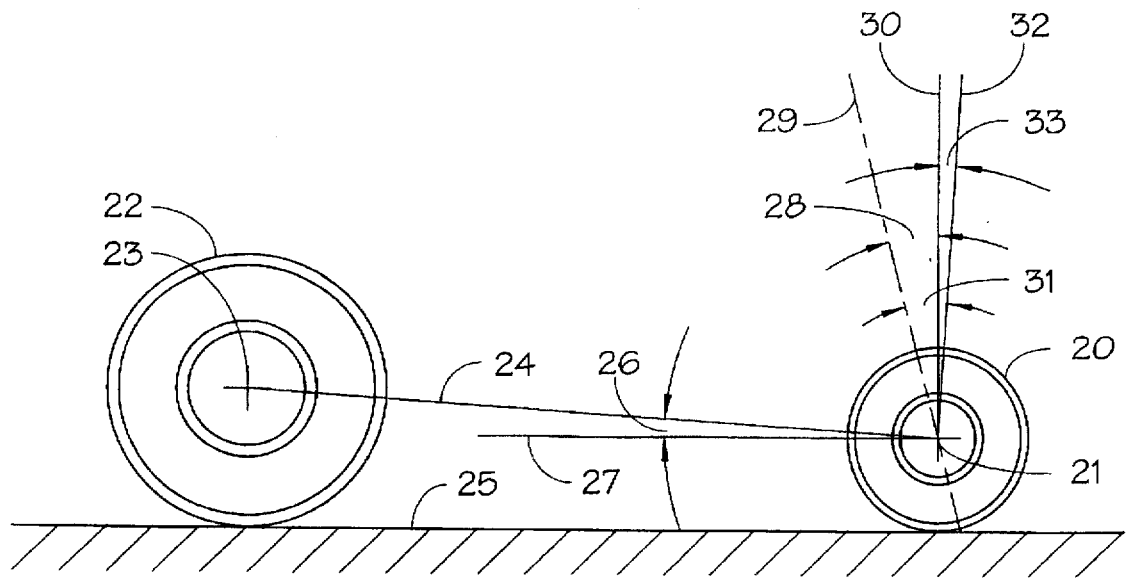
FIG. 2 is a side elevation view of front and rear vehicle wheels which have different diameters, thereby illustrating that the plane defined by the axes of rotation of the wheels does not correspond to the surface on which the wheels roll.

FIG. 2 is a side elevation view showing a right front wheel 20 and right rear wheel 22. Wheel 20 rotates about its axis of rotation 21 (perpendicular to the page) and wheel 22 rotates about its axis of rotation 23 (perpendicular to the page). If the left wheels are similar to the right wheels, then a plane 24 (perpendicular to the page) contains the locations of all four wheels. For simplicity in FIG. 2, the axes of rotation 21 and 23 are parallel and lie within plane 24. As is readily apparent from FIG. 2, plane 24 is not necessarily parallel to the surface 25 on which the vehicle wheels roll, due to the difference in diameters between the front and rear wheels. Line 27 is parallel to the rolling surface 25, thereby illustrating the angle 26 between the plane 24 and the rolling surface 25.

Caster of a steerable wheel is visualized as the rearward lean, in side elevation view, of the steering axis of that wheel. In more precise terms as shown in FIG. 2, caster of wheel 20 is the angle 28, in side elevation view, between the steering axis 29 and a perpendicular 30 to the rolling surface 25. If the alignment is erroneously measured relative to the plane 24 as being the angle 31 between the steering axis 29 and a perpendicular 32 to plane 24, then caster is measured in error by angle 26 between plane 24 and the rolling surface 25. As is readily apparent from FIG. 2, caster will be measured as larger than reality if the front wheels have smaller diameters than the rear wheels.

This error in measuring caster can have serious consequences. If caster is measured as more positive than reality (because the rear wheels are larger in diameter than the front wheels), it would then be adjusted to be more negative than its specification. This can lead to vehicle instability, especially during hard braking. If caster is measured as more negative than reality (because the front wheels are larger in diameter than the rear wheels), it would then be adjusted to be more positive than its specification. This can lead to hard steering. It is readily apparent from FIG. 2 that the alignment must be measured relative to the surface 25 on which the wheels roll, and therefore the alignment measurement apparatus must determine the locations and orientations of the wheels in relation to that surface. It is not sufficient to determine the locations and orientations of the wheels relative only to each other and not take the rolling surface 25 into account.

Figure 3:
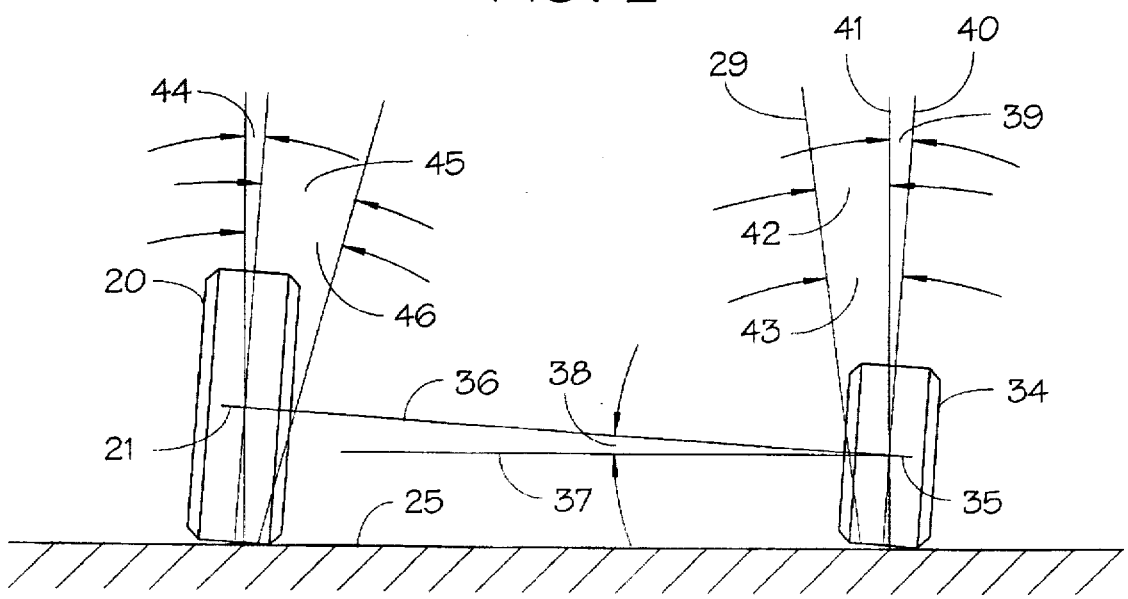
FIG. 3 is a front elevation view of left and right vehicle wheels which have different diameters, thereby illustrating that the plane defined by the axes of rotation of the wheels does not correspond to the surface on which the wheels roll.

FIG. 3 is a front elevation view showing a right front wheel 20 and left front wheel 34. Wheel 20 rotates about its axis of rotation 21 (lying in the page) and wheel 34 rotates about its axis of rotation 35 (lying in the page). If the rear wheels are similar to the front wheels, then a plane 36 (perpendicular to the page) contains the locations of all four wheels. For simplicity in FIG. 3, the axes of rotation 21 and 35 are collinear and lie within plane 36. As is readily apparent from FIG. 3, plane 36 is not necessarily parallel to the surface 25 on which the vehicle wheels roll, due to differences in the diameters between the left and right wheels. Line 37 is parallel to the rolling surface 25, thereby illustrating the angle 38 between the plane 36 and the rolling surface 25.

Camber of a wheel is visualized as the outward lean, in front elevation view, of the plane of the wheel. In more precise terms as shown in FIG. 3, camber of wheel 34 is the angle 39, in front elevation view, between a perpendicular 40 to the axis of rotation 35 and a perpendicular 41 to the rolling surface 25. If the alignment is erroneously measured relative to the plane 36, which is not necessarily parallel to the rolling surface 25, then camber is measured in error by angle 38. This produces a bias in the camber measurements toward one side of the vehicle, in that camber of the wheels on one side will be measured more positive than reality and camber of the wheels on the other side will be measured more negative than reality. In FIG. 3, left camber 30 and right camber 44 are clearly asymmetric when measured relative to the rolling surface 25, yet these same measurements are exactly symmetric when measured relative to the plane 36.

SAI of a steerable wheel is visualized as the inward lean, in front elevation view, of the steering axis of that wheel. In more precise terms as shown in FIG. 3, SAI of wheel 34 is the angle 42 between the steering axis 29 and a perpendicular 41 to the rolling surface 25. If the alignment is erroneously measured relative to the plane 36 as being the angle 43 between the steering axis 29 and a perpendicular 41 to plane 36, then SAI is measured in error by angle 38. This produces a bias in the SAI measurements toward one side of the vehicle, in that SAI of the wheels on one side will be measured more positive than reality and SAI of the wheels on the other side will be measured more negative than reality. In FIG. 3, left SAI 42 and right SAI 45 are clearly asymmetric when measured relative to the rolling surface 25, yet these same measurements are exactly symmetric when measured relative to the plane 36.

The errors in measuring camber and SAI can have serious consequences. If camber and SAI are measured with a side-to-side bias, then they would be adjusted with a similar bias. This can lead to "pull" and to steering instability. It is readily apparent from FIG. 3 that the alignment must be measured relative to the surface 25 on which the wheels roll, and therefore the alignment measurement apparatus must determine the locations and orientations of the wheels in relation to that surface. It is not sufficient to determine the locations and orientations of the wheels relative only to each other and not take the rolling surface 25 into account.

It is arguable that such errors are small, because vehicles normally have the same diameter tires on all four wheels, but such errors may easily be quite significant. Slightly different tire diameters for the four wheels of a vehicle can arise due to many factors, such as: 1) different brands of tires, 2) different sizes of tires, 3) different types of tires, 4) different tire inflation pressures, 5) different tire conditions, 6) different amounts of tread wear, and 7) differential loading of the vehicle. For example, a 0.25 inch difference in tire radius side-to-side with a 60 inch track width produces a side-toside bias in camber of $\tan^{-1}(0.25/60)=0.24°$, thus producing a measured difference between left and right camber of 0.48°. This is a highly significant error, and is in fact larger than the allowed tolerance for camber on many vehicles.

Figure 4:
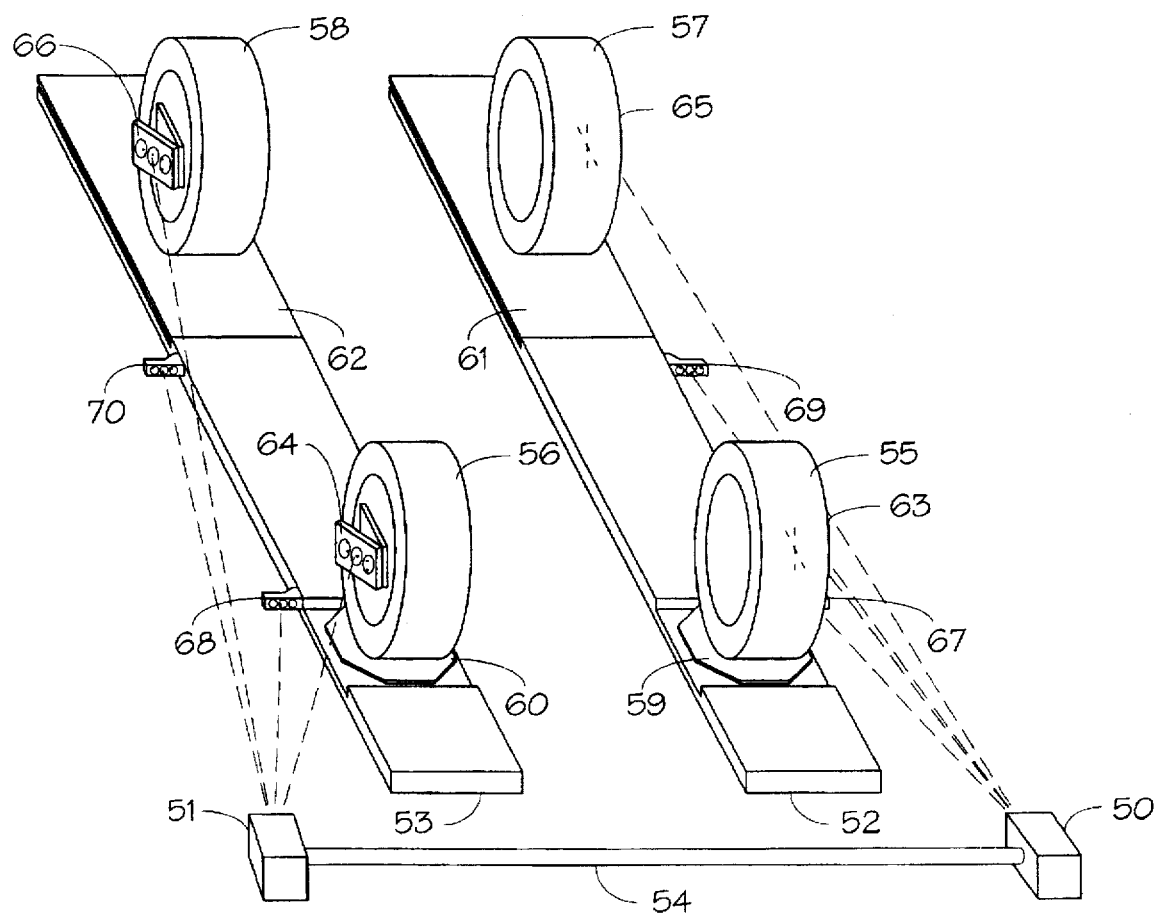
FIG. 4 is an isometric view of the preferred embodiment, illustrating how video cameras are used to view optical targets which are mounted to the vehicle wheels and to the lift rack runways on which the vehicle rests.

The present invention overcomes these difficulties by referencing all the alignment measurements to the plane on which the wheels roll. This is accomplished by measuring where that plane is as shown in FIG. 4. Left video camera 50 is oriented such that its field of view extends alongside the left side of the vehicle to be measured, thus camera 50 is outboard and above the left runway 52 of the alignment lift rack. Similarly, right video camera 51 is oriented such that its field of view extends alongside the right side of the vehicle to be measured, thus camera 51 is outboard and above the right runway 53 of the alignment lift rack. The cameras 50 and 51 are mounted to opposite ends of a rigid bar 54 such that their fields of view are rigidly, though not necessarily perfectly, aligned, each with the other. The field of view of camera 50 looks downward and inward, such that it can see optical targets which are mounted to the left vehicle wheels and optical targets which are mounted to the left side of the left runway 52. Similarly, the field of view of camera 51 looks downward and inward, such that it can see optical targets which are mounted to the right vehicle wheels and optical targets which are mounted to the right side of the right runway 53. In a conventional manner, the vehicle rests on the runways 52 and 53 of the alignment lift rack such that the left front wheel 55 rests on turnplate 59, the right front wheel rests on turnplate 60, the left rear wheel 57 rests on slip plate 61, and the right rear wheel rests on slip plate 62.

An optical target 64 is mounted to the right front wheel 56 such that it is within the field of view of camera 51. Similarly, optical target 63 (not visible behind the curve of the wheel 55) is mounted to the left front wheel 55 such that it is within the field of view of camera 50. Optical target 66 is mounted to the right rear wheel 58 such that it is within the field of view of camera 51. Similarly, optical target 65 (not visible behind the curve of the wheel 57) is mounted to the left rear wheel 57 such that it is within the field of view of camera 50. The optical targets 63–66 are rigidly mounted to the vehicle wheels 55–58 in a conventional manner such that, once mounted, their relationships with the respective wheels are fixed throughout the measurement process, thus allowing the positions and orientations of the optical targets 63–66 to be used to determine the positions and orientations of the wheels 55–58, respectively.

The optical targets 63–66 operate with the fields of view of cameras 50 and 51 in the manner described in WO document 94/05969, except that two separate cameras, each with its own field of view, are used instead of a single camera operating with beam splitters, mirrors, and such to create two fields of view. Using two cameras, each with its own field of view, is equivalent to using a single camera with mirrors and beam splitters such that the single camera has two fields of view. It is significant that optical targets which are mounted to all four vehicle wheels cannot satisfactorily be made to simultaneously lie in a single field of view of a camera. It is important to note that each camera 50 and 51, i.e. each field of view, has its own coordinate system for determining the locations of optical targets which it sees. This leads to the problem of determining the relative alignment of one field of view with the other.

Cameras 50 and 51 are connected to a suitable computer and display (not shown) such that appropriate software is able to process the optical target images seen by the cameras. As described in WO document 94/05969, camera 50 is used to determine, in a coordinate system relative to the field of view of camera 50, the coordinates and orientations of the optical targets 63 and 65, and thus the coordinates and orientations of wheels 55 and 57, respectively. Similarly, camera 51 is used to determine, in a coordinate system relative to the field of view of camera 51, the coordinates and orientations of the optical targets 64 and 66, and thus the coordinates and orientations of wheels 56 and 58, respectively.

The present invention includes an optical target 67, which is mounted to the outboard side of left runway 52 near the rearward edge of turnplate 59, and an optical target 69, which is mounted to the outboard side of left runway 52 near the forward edge of slip plate 61. Optical targets 67 and 69 appear in the field of view of camera 50. Similarly, the present invention includes an optical target 68, which is mounted to the outboard side of right runway 53 near the rearward edge of turnplate 60, and an optical target 70, which is mounted to the outboard side of right runway 53 near the forward edge of slip plate 62. Optical targets 68 and 70 appear in the field of view of camera 51. The coordinates and orientations of optical targets 67 and 69 are determined using camera 50 in the same manner and at the same time as those of optical targets 63 and 65. Similarly, the coordinates and orientations of optical targets 68 and 70 are determined using camera 51 in the same manner and at the same time as those of optical targets 64 and 66.

Optical targets 67 and 69 are mounted such that each is located a known distance from the planar surface of the runway 52. Similarly, optical targets 68 and 70 are mounted such that each is located a known distance from the planar surface of the runway 53. Thus the optical targets 67–70 are used during the measurement process to define and measure the location in the three dimensional coordinate system of the common plane of the runways 52 and 53 on which the vehicle wheels roll. The four optical targets 67–70 provide redundancy, including a check to see that the runways 52 and 53 are adjusted such that they truly describe a plane. The manner in which this check is performed is explained presently.

FIG. 4 does not show the precise structure for mounting the cameras 50 and 51 to the floor or to the lift rack, as such mountings are not critical. The critical requirements are two: 1) the cameras 50 and 51 must be rigidly mounted to a bar 54 or similar rigid structure, such that their respective fields of view are rigidly aligned, each relative to the other, and 2) the cameras 50 and 51 and the alignment lift rack must be stable during the measurement process such that clear, well-focused images of the optical targets are formed by the cameras.

Figure 5:
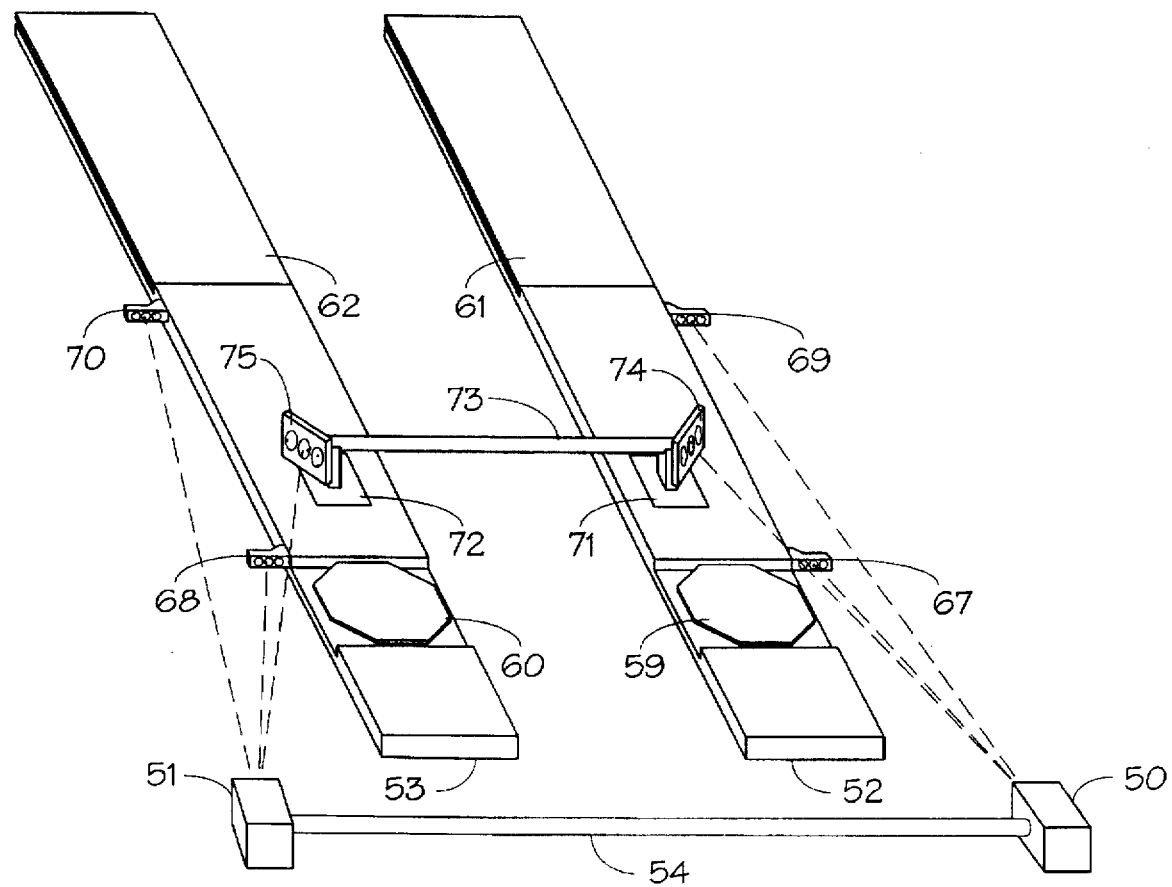
FIG. 5 is an isometric view of the preferred embodiment, illustrating how a calibration fixture is used to determine the relationship between the fields of view of the video cameras.

The precise relationship between the fields of view of cameras 50 and 51 is determined by a calibration procedure illustrated in FIG. 5. A calibration stand 71 is set on the middle of left runway 52. A similar stand 72 is set on the middle of right runway 53. These stands 71 and 72 are designed such that each rests on a 3-point support, thereby insuring that the stands 71 and 72 are very solid and cannot wobble. A stiff cylindrical bar 73 is laid across the stands 71 and 72 such that it is free to rotate through at least part of a revolution about its longitudinal axis. An optical target 74 is mounted to the left end of the bar 73 such that it lies within the field of view of left camera 50. A similar optical target 75 is mounted to the right end of the bar 73 such that it lies within the field of view of right camera 51. The stands 71 and 72 and the bar 73 are designed such that no motion of the bar 73 is allowed except rotation about a longitudinal axis. The bar 73 and optical targets 74 and 75 are designed such that the distance between the points which constitute the "locations" of the optical targets 74 and 75 is predetermined, and the locations of the optical targets 74 and 75 lie along the axis of rotation of the bar 73. The distance between the target "locations" in space is critical, but the orientations of the targets is not, as long as the cameras 50 and 51 can see the targets to determine their locations and orientations.

The first phase of the calibration procedure begins by allowing the cameras 50 and 51 to see the optical targets 74 and 75 respectively, at which time the system determines the location and orientation of optical target 74 in the field of view of camera 50 and the location and orientation of optical target 75 in the field of view of camera 51. (Note that both cameras should first be individually calibrated so that the various measurements are accurate. This may involve, if desired, targets such as those shown in the present application.) After the location and orientation of optical targets 74 and 75 are determined, the bar is then rotated through a partial revolution about its longitudinal axis such that the optical targets 74 and 75, which rotate with the bar, remain within the field of view of the corresponding cameras 50 and 51. The cameras 50 and 51 are again allowed to see the optical targets 74 and 75 respectively, at which time the system again determines the location and orientation of optical target 74 in the field of view of camera 50 and the location and orientation of optical target 75 in the field of view of camera 51.

The change in orientation of optical target 74 is due only to the rotation of the bar 73, and is therefore used to determine the equation of the line containing the axis of rotation of the bar 73 in the coordinate system of the camera 50. Similarly, the change in orientation of optical target 75 is due only to the rotation of the bar 73, and is therefore used to determine the equation of the line containing the axis of rotation of the bar 73 in the coordinate system of the camera 51. The transformations required are identical to those used to determine the orientation of the axis of rotation of a wheel from the changes in the image of the attached optical target, as described in WO document 94/05969. Because the optical targets 74 and 75 are a known distance apart, the location of target 75 is thus also known in the coordinate system of camera 50 and the location of target 74 is thus also known in the coordinate system of camera 51. The relationship between the field of view of camera 50 and the field of view of camera 51 is thus completely known, allowing coordinates and orientations of targets in the coordinate system of camera 51 to be transformed to coordinates and orientations of targets in the coordinate system of camera 50, and vice-versa.

In an alternate embodiment, the bar 73 is translated a short distance along an axis instead of being rotated about an axis. The change in position of the optical target 74 is due only to the translation of the bar 73, and is therefore used to determine the equation of the line defining the axis of translation in the coordinate system of the camera 50. Similarly, the change in position of the optical target 75 is due only to the translation of the bar 73, and is therefore used to determine the equation of the line defining the axis of translation in the coordinate system of the camera 51. Because the optical targets 74 and 75 are a known distance apart, the location of target 75 is thus also known in the coordinate system of camera 50 and the location of target 74 is thus also known in the coordinate system of camera 51. The relationship between the field of view of camera 50 and the field of view of camera 51 is thus completely known, allowing coordinates and orientations of targets in the coordinate system of camera 51 to be transformed to coordinates and orientations of targets in the coordinate system of camera 50, and vice versa.

Proper use of this (indeed of any) alignment system requires that the vehicle rest on a flat surface and the lift rack must be adjusted to provide such a surface. Accordingly, the second phase of the calibration procedure begins by allowing the camera 50 to see the optical targets 67 and 69 and allowing the camera 51 to see the optical targets 68 and 70, at which point the system determines the locations and orientations of optical targets 67 and 69 in the field of view of camera 50 and the locations and orientations of optical targets 68 and 70 in the field of view of camera 51. Using the known relationship between the field of view of camera 50 and the field of view of camera 51, as determined by the calibration procedure discussed above, the coordinates and orientations of optical targets 68 and 70 are transformed from the coordinate system of camera 51 to the coordinate system of camera 50, such that the coordinates of all four optical targets 67–70 are known in a common coordinate system.

If the locations of the optical targets 67–70 are described by the corresponding three-dimensional coordinates $(X_{LF}, Y_{LF}, Z_{LF})$, $(X_{LR}, Y_{LR}, Z_{LR})$, $(X_{RF}, Y_{RF}, Z_{RF})$, and $(X_{RR}, Y_{RR}, Z_{RR})$, then the locations of the optical targets 67–70 lie in a plane if $$\begin{vmatrix} X_{LF} & Y_{LF} & Z_{LF} & 1 \\ X_{RF} & Y_{RF} & Z_{RF} & 1 \\ X_{LR} & Y_{LR} & Z_{LR} & 1 \\ X_{RR} & Y_{RR} & Z_{RR} & 1 \end{vmatrix} = 0 \qquad (1)$$

If, for example, three optical targets 67–69 are used to determine a plane, then the plane is described by the equation $$\begin{vmatrix} x & y & z & 1 \\ X_{LF} & Y_{LF} & Z_{LF} & 1 \\ X_{RF} & Y_{RF} & Z_{RF} & 1 \\ Z_{LR} & Y_{LR} & Z_{LR} & 1 \end{vmatrix} = 0 \qquad (2)$$

which can be expressed in the form $$Ax + By + Cz + D = 0 \qquad (3)$$

The reduction to this form is made simply by evaluating the determinant and gathering like terms. The distance q (not illustrated) from the runway target 70 at $(X_{RR}, Y_{RR}, Z_{RR})$ to this plane is then determined by $$q = \frac{AX_{RR} + BY_{RR} + CZ_{RR} + D}{\pm \sqrt{A^2 + B^2 + C^2}} \qquad (4)$$

The distance q is thus a direct measure of how much the runway located at the optical target 70 must be raised or lowered to adjust the lift rack such that the runways 52 and 53 describe a flat surface. Accordingly, the distance q is displayed on the display screen (not shown) in numerical form or in conventional bar graph form such that it provides a visual aid in making these adjustments to the lift rack. It is recommended that a representative vehicle be driven onto the runways 50 and 51 while this adjustment is made so that the lift rack is in the same loaded condition as when it is used to measure and adjust vehicles.

Further calibration information is computed to allow the calibration to be checked during normal operation. The distance between optical targets 67 and 69 is computed as $$D_{LF-LR} = \sqrt{(X_{LF} - X_{LR})^2 + (Y_{LF} - Y_{LR})^2 + (Z_{LF} - Z_{LR})^2} \quad (5)$$

Also, the distance between optical targets 68 and 70 is computed as $$D_{RF-RR} = \sqrt{(X_{RF} - X_{RR})^2 + (Y_{RF} - Y_{RR})^2 + (Z_{RF} - Z_{RR})^2} \quad (6)$$

The calibration process is completed by storing the information obtained during the calibration process into a non-volatile memory. As is routinely practiced in the art, this calibration information is then recalled and used as needed during normal operation.

An alternate embodiment provides that optical targets 67–70 are viewed only during the calibration process. In the manner described above, the runways 52 and 53 are adjusted to describe a flat surface, and the equation describing that flat surface is retained in non-volatile memory along with other calibration data. This equation is recalled and used as needed during normal operation. The optical targets 67–70 can be temporarily attached to or simply laid upon the runways 52 and 53 during the calibration process. A severe limitation of this embodiment is that the relationships between the cameras 50 and 51 and the runways 52 and 53 must remain fixed with a high degree of precision after calibration, as any movement of the cameras 50 and 51 relative to the lift rack after calibration can result in a severe mismeasurement of the vehicle alignment because the plane describing the rolling surface is no longer correctly known. A further limitation is that the calibration of the cameras 50 and 51 and the flatness of the runways 52 and 53 cannot be checked automatically during normal operation by using the measured locations of the optical targets 67–70.

Determining the Alignment Parameters

During normal operation, the system operates step by step through a continuously repeating cycle. The steps are: Step 1) The system views all the optical targets 63–70 using cameras 50 and 51; Step 2) The system determines the coordinates and orientations of the optical targets 63, 65, 67, and 69 in the coordinate system of camera 50, and the coordinates and orientations of the optical targets 64, 66, 68, and 70 in the coordinate system of camera 51, using the methods and transformations as discussed in WO document 94/05969; Step 3) Using the known relationship between the fields of view of cameras 50 and 51, as determined during the calibration process, the system transforms the coordinates and orientations of the optical targets 64, 66, 68, and 70 viewed by camera 51 into the coordinate system of camera 50, such that the coordinates and orientations of all optical targets 63–70 are in the same coordinate system; Step 4) As will be discussed presently, the system checks the calibration of the cameras; Step 5) As will be discussed presently, the system computes the wheel alignment parameters from the coordinates and orientations of the optical targets 63–70; Step 6) The system updates the display such that the operator may observe and/or adjust the alignment condition of the vehicle. Operating in a continuous cyclic manner such as this is conventional.

In Step 2, several tests are routinely and automatically performed to insure that the calibration of the system has not changed. For example, the distance between optical targets 67 and 69 is computed using equation (5) as described previously and compared to the corresponding distance which was determined and stored during the calibration process. A deviation indicates that the camera 50 has suffered a change in focal length and must be corrected, after which the system must be recalibrated. A similar check is performed with the coordinates of optical targets 68 and 70 using equation (6) to verify the focal length of camera 51. Additionally, the coordinates of the optical targets 67–70 are checked using equation (1) as described previously to verify that they still lie in a plane, meaning that the runways still form the requisite flat surface. A deviation of this surface indicates either that the lift rack has suffered damage or come out of adjustment, or that the cameras 50 and 51 no longer have the same relative alignments of their fields of view. In either case, the system requires recalibration as described above. A system which passes these tests is assumed to have the same integrity as when it was last calibrated.

The alignment computations begin by determining the equation of the alignment reference plane from the locations of optical targets 67–69. This alignment reference plane is determined using equation (2) and represents the surface on which the vehicle wheels 55–58 roll. Note that any three of the four optical targets 67–70 can be used for this purpose, assuming all four targets lie in a plane. Since there are four such combinations possible, there are four possible equations, each in the form of equation (3), which define the plane. These four equations can be combined to form an "average" plane in the form of equation (3) such that its A, B, C, and D coefficients are the averages of the corresponding coefficients of the four equations, thus "averaging" any relatively insignificant deviations of the runways from perfect flatness.

Figure 6:
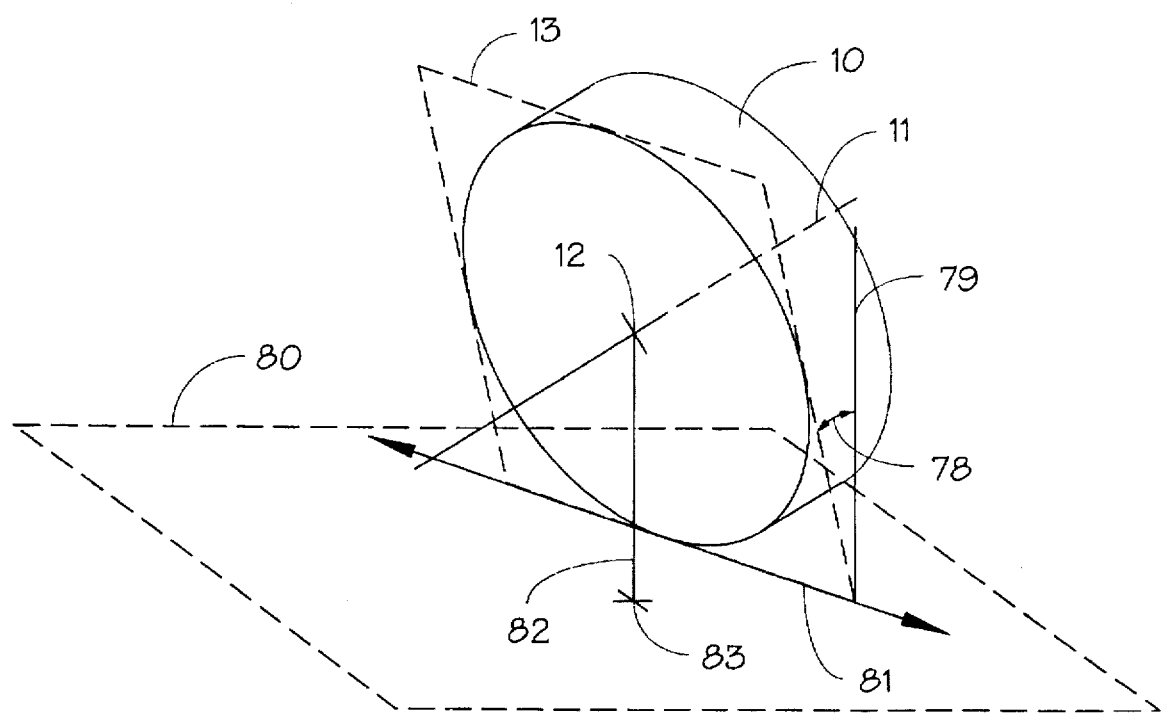
FIG. 6 is an isometric view of a vehicle wheel, illustrating how the location and rolling direction of the wheel in a vehicle reference plane are determined.

FIG. 6 is an expansion of FIG. 1, illustrating how the location and orientation of a vehicle wheel 10 (shown with exaggerated camber) is determined relative to the alignment reference plane 80. Line 81 represents the rolling direction of the plane of rotation 13 of the wheel 10. It is determined as the intersection of the plane of rotation 13 with the reference plane 80. The location 12 of the wheel 10 is represented in the reference plane 80 as point 83, which is determined as the projection of the location 12 onto the reference plane 80.

The camber angle 78 of the wheel 10 is determined as the angle between the plane of rotation 13 of the wheel 10 and a perpendicular 79 to the reference plane 80. An equivalent determination is the angle between the axis of rotation 11 of the wheel 10 and the reference plane 80. The camber angle of a wheel is defined to be positive if the wheel leans outward at the top, relative to the reference plane. In this manner, the camber of a vehicle wheel is defined as in conventional alignment systems such that it is relative to the surface on which the vehicle wheels roll.

Figure 7:
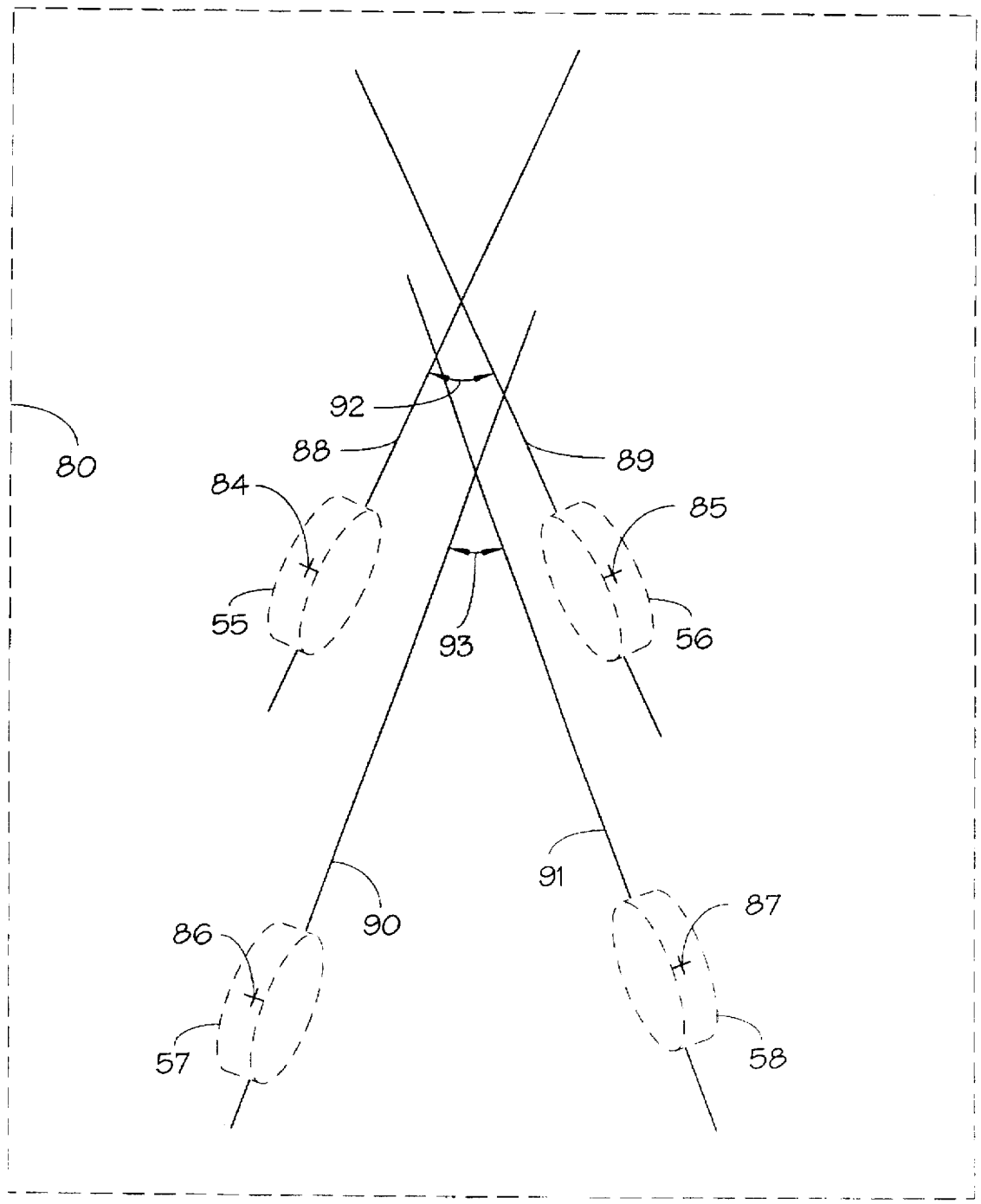
FIG. 7 is a plan view showing the projections of the locations of four vehicle wheels onto a vehicle reference plane, along with the lines describing the rolling directions of the wheels. The locations and camber of the wheels are exaggerated for clarity. Total toe of the front and rear wheels are determined.

As shown in FIG. 7, the locations 84–87 of the vehicle wheels 55–58, respectively, are determined by projections onto the reference plane 80. The rolling directions 88–91 of the wheels 55–58, respectively, are determined by the intersections of the planes of rotations of the wheels 55–58 with the reference plane 80. All the toe and symmetry vehicle wheel alignment parameters are determined from the projected wheel locations 84–87 and the wheel rolling directions 88–91 as angles or distances in the reference plane 80.

In FIG. 7, the total front toe angle 92 is determined as the angle in the reference plane 80 between the rolling directions 88 and 89 of the front wheels 55 and 56, respectively. Similarly, the total rear toe angle 93 is determined as the angle in the reference plane 80 between the rolling directions 90 and 91 of the rear wheels 57 and 58, respectively. Total toe of an axle is defined to be positive when the leading edges of the tires are closer together than the trailing edges. In this manner, total toe of each axle is defined as in conventional wheel alignment systems.

Figure 8:
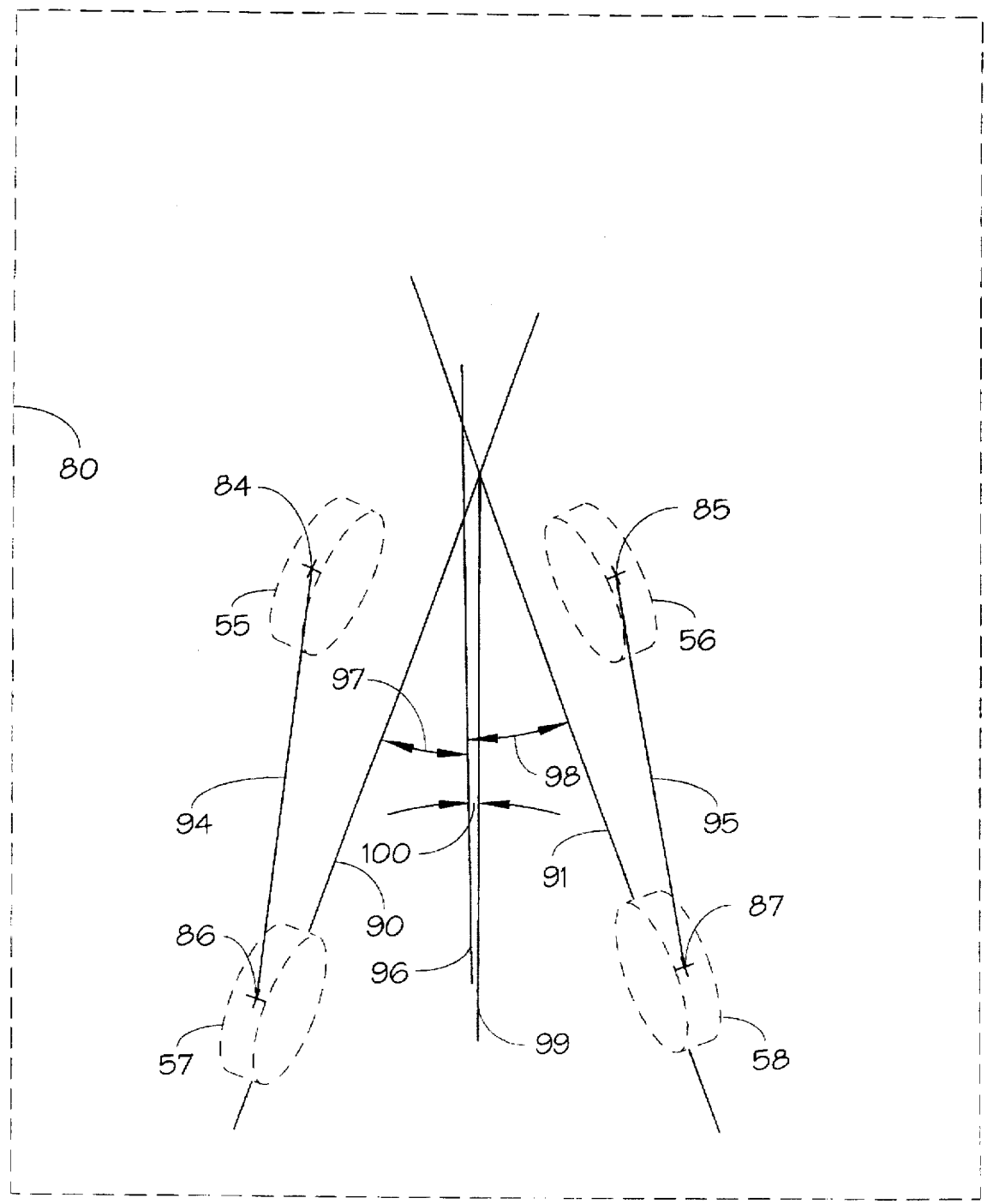
FIG. 8 is similar to FIG. 7, illustrating how the reference axis for measuring rear individual toe is determined from the locations of the four vehicle wheels.

In FIG. 8, line segment 94 is determined which joins the locations 84 and 86, in the reference plane 80, of the left wheels 55 and 57, respectively. Similarly, line segment 95 is determined which joins the locations 85 and 87, in the reference plane 80, of the right wheels 56 and 58, respectively. The centerline 96 is determined to be the bisector of the angle formed by line segments 94 and 95. In this manner, the centerline 96, which is used as the reference axis for determining the rear individual toe alignment angles, is defined as in conventional wheel alignment systems.

Left rear toe 97 is determined as the angle between the rolling direction 90 of the left rear wheel 57 and the centerline 96. Similarly, right rear toe 98 is determined as the angle between the rolling direction 91 of the right rear wheel 58 and the centerline 96. Rear individual toe is defined as positive when the leading edge of the tire is closer to the centerline 96 than the trailing edge. In this manner, the individual rear toe alignment angles 97 and 98 of the rear wheels 57 and 58 are defined as in conventional wheel alignment systems such that each is relative to the centerline 96 of the vehicle.

The thrust line 99 is determined as the line in the reference plane 80 which bisects the angle formed by the rolling directions 90 and 91 of the rear wheels 57 and 58, respectively. The thrust angle 100 is determined as the angle in the reference plane between the thrust line 99 and the centerline 96. The thrust angle 100 is defined to be positive when the thrust line 99 points to the right (clockwise) relative to the centerline 96. In this manner, the thrust line 99 and the thrust angle 100 are defined as in conventional alignment systems.

Figure 9:
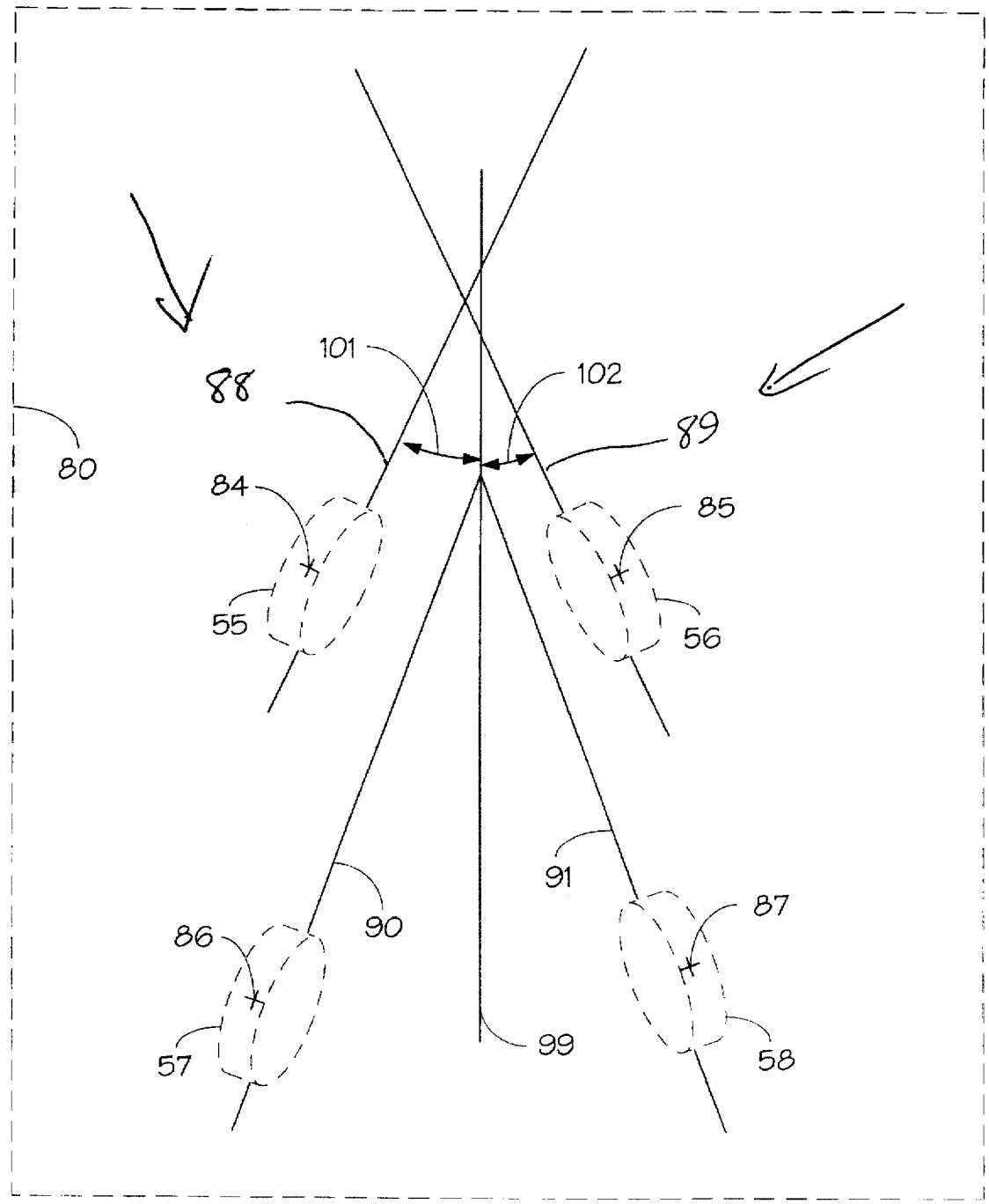
FIG. 9 is similar to FIG. 7, illustrating how the reference axis for measuring front individual toe is determined from the pointing directions of the rear wheels.

In FIG. 9, left front toe is determined as the angle 101 in the reference plane 80 between the rolling direction 88 of the left front wheel 55 and the thrust line 99. Similarly, right front toe is determined as the angle 102 in the reference plane 80 between the rolling direction 89 of the right front wheel 56 and the thrust line 99. Front individual toe is defined as positive when the leading edge of the tire is closer to the thrust line 99 than the trailing edge. In this manner, the individual front toe alignment angles 101 and 102 of the front wheels 55 and 56 are defined as in conventional wheel alignment systems such that each is relative to the thrust line 99 of the rear wheels 57 and 58.

Figure 10:
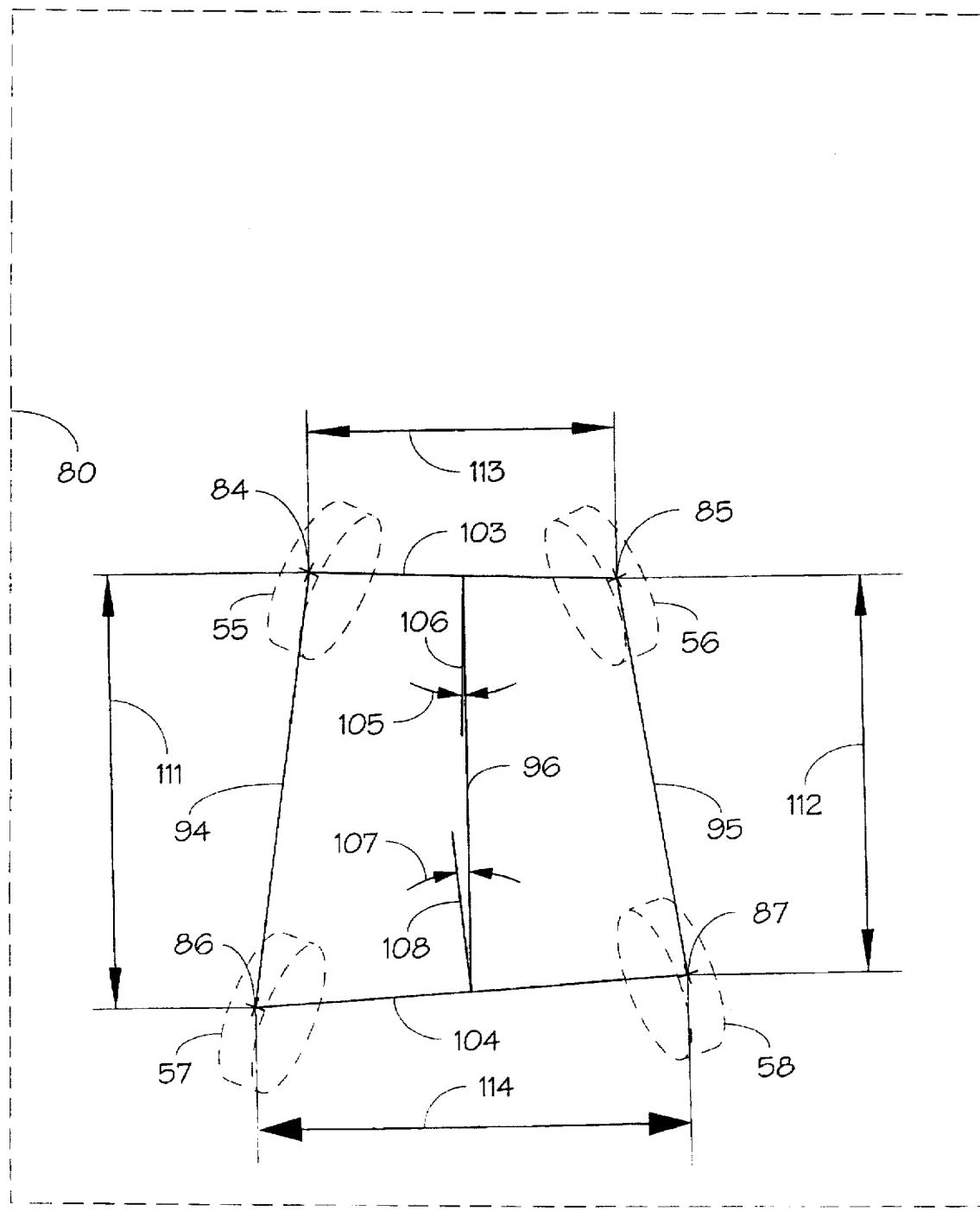
FIG. 10 is similar to FIG. 7, illustrating how symmetry angles and distances of the vehicle wheels are measured from the locations of the wheels.

In FIG. 10, line segment 103 is determined which joins the locations 84 and 85 in the reference plane 80 of the front wheels 55 and 56, respectively. Similarly, line segment 104 is determined which joins the locations 86 and 87 in the reference plane 80 of the rear wheels 57 and 58, respectively. The front set back angle 105 is determined as the angle in the reference plane 80 between the centerline 96 and a perpendicular 106 to line segment 94. Similarly, the rear set back angle 107 is determined as the angle in the reference plane 80 between the centerline 96 and a perpendicular 108 to line segment 94. The set back angle of an axle is defined to be positive if the right wheel of the axle is set more rearward compared to the left wheel, relative to the centerline 96. In this manner, the front and rear set back angles 105 and 107, respectively, are defined as in conventional wheel alignment systems such that each is relative to the centerline 96.

The track width difference angle (not shown) is determined as the angle in the reference plane 80 between line segments 94 and 95. This angle provides an indication that the track width is not the same for the front axle as for the rear axle. The wheelbase difference angle (not shown) is determined as the angle in the reference plane 80 between line segments 103 and 104. This angle provides an indication that the wheelbase is not the same for the left side of the vehicle as for the right side. In this manner, the track width difference angle and wheelbase difference angles are defined as in conventional wheel alignment systems.

In FIG. 10, the wheelbase 111 at the left side of the vehicle is determined as the distance, in a direction parallel to the centerline 96, between the left wheel positions 84 and 86, respectively. Similarly, the wheelbase 112 at the right side of the vehicle is determined as the distance, in a direction parallel to the centerline 96, between the right wheel positions 85 and 87, respectively. The track width 113 at the front end of the vehicle is determined as the distance, in a direction perpendicular to the centerline 96, between the front wheel positions 84 and 85, respectively. Similarly, the track width 114 at the rear end of the vehicle is determined as the distance, in a direction perpendicular to the centerline 96, between the rear wheel positions 86 and 87, respectively. In this manner, the track width and wheelbase measurements are defined as in conventional alignment systems.

The caster and SAI angles of the steerable wheels are determined as in conventional alignment systems per the procedure discussed in SAE Publication 850219, titled "Steering Geometry and Caster Measurement", by January.

Other optical targets can be mounted to the vehicle frame, vehicle body, or some combination thereof. The locations of these targets, which can be determined in the same manner as the targets mounted to the vehicle wheels and to the runways, can be projected onto the reference plane and used to determine the longitudinal reference axis for measuring rear individual toe and other parameters. They can also be used to measure wheel and axle offset and set back, in the same manner as described in application Ser. No. 08/371, 007. The difficulty with this, however, is that there are no industry standards for mounting such targets to to the vehicle body or frame or for making use of the location measurements thereof.

In view of the above it will be seen that the various objects and features of the invention are achieved, and other advantageous results obtained. It should be understood that the description contained herein is illustrative only and is not to be taken in a limiting sense.

What is claimed is:

1. A wheel alignment apparatus for determining the alignment of the wheels of a vehicle in relation to the surface on which the vehicle wheels roll, said apparatus comprising:
    a first set of predetermined optical targets adapted to be mounted one to each of the wheels of a vehicle;
    a second set of predetermined optical targets disposed in a predetermined geometrical relationship with respect to the surface on which said vehicle wheels roll;
    at least one video camera disposed to receive images of said first optical targets and said second optical targets;
    a computer operatively connected to said at least one camera, said computer being responsive to the images of said first set of targets and to the images of said second set of targets to determine values of wheel alignment parameters of the vehicle relative to said surface on which said vehicle wheels roll.

2. The wheel alignment apparatus as set forth in claim 1 wherein the computer is responsive to the images of said first set of targets to determine the coordinates and orientations of said first set of targets in a three dimensional coordinate system, said computer also being responsive to the images of said second set of targets to determine the coordinates of said second set of targets in said three dimensional coordinate system, whereby the computer determines from said coordinates and orientations of said first set of targets and said coordinates of said second set targets said wheel alignment parameters relative to said surface.

19

3. The wheel alignment apparatus as set forth in claim 1 wherein the apparatus includes first and second video cameras.

4. The wheel alignment apparatus as set forth in claim 3 wherein the video cameras are disposed in a fixed geometrical relationship.

5. The wheel alignment apparatus as set forth in claim 3 wherein the video cameras are disposed to view opposite sides of the vehicle, at least one of said optical targets of the second set being in a field of view of the said first video camera and at least one of said optical targets of the second set being in a field of view of the second video camera.

6. The wheel alignment apparatus as set forth in claim 5 wherein at least two of the optical targets of the first set are disposed in the field of view of the first video camera and at least two of the optical targets of the first set are disposed in the field of view of the second video camera.

7. The wheel alignment apparatus as set forth in claim 1 further including a runway upon which the wheels of the vehicle are disposed, said second set of optical targets being disposed in a fixed, predetermined relationship with respect to the runway.

8. The wheel alignment apparatus as set forth in claim 7 wherein the second set of optical targets are removably mounted with respect to the runway.

9. A method of calibrating wheel alignment apparatus having first and second fields of view, said method comprising the steps of:

disposing a first optical target in the first field of view and disposing a second optical target in the second field of view, said first and second optical targets being fixed with respect to each other;

obtaining a first image of the first optical target in the first field of view and obtaining a first image of the second optical target in the second field of view;

changing the orientation of the first optical target in the first field of view to a new orientation and changing the orientation of the second optical target in the second field of view to a new orientation without changing the orientation of the first and second optical targets with respect to each other;

obtaining a second image of the first optical target in the first field of view at the new orientation and obtaining a second image of the second optical target in the second field of view at the new orientation; and determining from said images the relative alignment of the first field of view relative to the second field of view.

10. The method of calibrating wheel alignment apparatus as set forth in claim 9 wherein the first and second optical targets are fixedly disposed at the ends of a rotatable member, said rotatable member having a longitudinal axis, said step of changing the orientation of the first and second optical targets including rotating the rotatable member from a first rotational position to a second rotational position.

11. The method of calibrating wheel alignment apparatus as set forth in claim 10 wherein said step of disposing the first and second optical targets in the first and second fields of view includes disposing the rotatable member in a fixture which rigidly aligns the first field of view with the second field of view.

12. The method of calibrating wheel alignment apparatus as set forth in claim 9 wherein the images in the first field of view are formed in a first video camera and the images in the second field of view are formed in a second video camera.

13. A method for calibrating wheel alignment apparatus, said method comprising the steps of:

20 providing a first video camera having a first field of view and a second video camera having a second field of view;

providing a first fixture arranged so as to rigidly align said first field of view with said second field of view;

providing a first and second calibration optical target such that said first and second calibration targets are rigidly joined together by a second fixture such that said first calibration optical target is at a first orientation in said first field of view while said second calibration optical target is at a first orientation in said second field of view;

determining a first set of coordinates and orientation of said first calibration optical targets in a first three dimensional coordinate system from the image formed of said first calibration optical target by said first video camera;

determining a first set of coordinates and orientation of said second calibration optical targets in a second three dimensional coordinate system from the image formed of said second calibration optical target by said second video camera;

rotating said first and second calibration targets along with said second fixture about an axis through at least a partial revolution such that said first calibration optical target lies at a second orientation within said first field of view and such that said second calibration optical target lies at a second orientation within said second field of view;

determining a second set of coordinates and orientation values of said first calibration optical targets in a first three dimensional coordinate system from the image formed of said first calibration optical target by said first video camera;

determining a second set of coordinates and orientation values of said second calibration optical targets in a second three dimensional coordinate system from the image formed of said second calibration optical target by said second video camera; and determining, from said first and second sets of coordinates and orientations of said first calibration target and from said first and second sets of coordinates and orientations of said second calibration targets, the relative alignment of said first field of view relative to said second field of view.

14. A method for measuring the relative alignment of the runways of an automotive lift rack used for measuring the alignment of vehicle wheels, said method comprising the steps of:

disposing at least first and second predetermined optical targets along a first runway of the automotive lift rack;

disposing at least third and fourth predetermined optical targets along the a second runway of the automotive lift rack;

obtaining images of said first, second, third and fourth optical targets;

determining from the images of the first, second and third optical targets a plane which contains said first, second and third optical targets;

determining from the image of the fourth optical target the distance between said fourth target and the plane defined by the other three targets, said distance being a measure of the relative alignment of the first and second runways.

15. The method of measuring the relative alignment of the runways of an automotive lift rack as set forth in claim 14 wherein the images of the optical targets are obtained when a vehicle is disposed on the first and second runways of the automotive lift rack.

16. The method of measuring the relative alignment of the runways of an automotive lift rack as set forth in claim 14 wherein the images of all four optical targets are obtained in a single video camera.

17. The method of measuring the relative alignment of the runways of an automotive lift rack as set forth in claim 14 wherein the images of the first and second optical targets are obtained in a first video camera, and the images of the third and fourth optical targets are obtained in a second video camera.

18. The method of measuring the relative alignment of the runways of an automotive lift rack as set forth in claim 14 further including the step of displaying to a human user an indication of the distance of the fourth optical target from the plane defined by the other three targets.

19. The method of measuring the relative alignment of the runways of an automotive lift rack as set forth in claim 18 further including the step of adjusting the geometrical orientation of the runways in response to the displayed indication of distance.

20. A method for measuring the relative alignment of the runways of an automotive lift rack used for measuring the alignment of vehicle wheels, said method comprising the steps of:

providing a first set of at least two optical targets of predetermined configuration and appearance mounted to one runway of a lift rack so as to represent the surface of said one runway on which the corresponding wheels of a vehicle rolls;

providing a second set of at least two optical targets of predetermined configuration and appearance mounted to the other runway of a lift rack so as to represent the surface of said other runway on which the corresponding wheels of a vehicle rolls;

providing a first video camera arranged so as to be able to view said first optical targets;

providing a second video camera arranged so as to be able to view said second optical targets;

providing a computer operatively connected to said first and said second camera, said computer being responsive to the viewed images of said first set of targets to determine the coordinates of said first set of targets in a three dimensional coordinate system, said computer also being responsive to the viewed images of said second set of targets to determine the coordinates of said second set of targets in said three dimensional coordinate system, determining a plane from two optical targets of said first set of optical targets and one optical target of said second set of optical targets;

determining the distance between said plane and another optical target of said second set of optical targets;

providing a display operatively connected to computer; and driving said display to show a visual indication of said distance.

21. A wheel alignment apparatus for determining vehicle wheel alignment parameters comprising:

a set of wheel targets, each wheel target being adapted to be attached to a wheel of a vehicle;

a set of surface targets, each surface target being adapted to be mounted in a predetermined geometrical relationship with respect to a surface upon which the wheels of said vehicle are disposed;

a computer responsive to the wheel targets and to the surface targets to determine wheel alignment parameters of the vehicle relative to the surface upon which the vehicle wheels are disposed.

22. The wheel alignment apparatus for determining vehicle wheel alignment parameters as set forth in claim 21 wherein the wheel targets are first, second, third and fourth optical targets.

23. The wheel alignment apparatus for determining vehicle wheel alignment parameters as set forth in claim 21 wherein there are at least three surface optical targets.

24. The wheel alignment apparatus for determining vehicle wheel alignment parameters as set forth in claim 23 wherein there are four surface orientation optical targets.

25. The wheel alignment apparatus for determining vehicle wheel alignment parameters as set forth in claim 21 wherein the computer is responsive to the images of said set of wheel orientation responsive units, said computer also being responsive to the images of said set of surface orientation responsive units.

26. The wheel alignment apparatus for determining vehicle wheel alignment parameters as set forth in claim 21 wherein the apparatus includes first and second video cameras disposed in a fixed geometrical relationship.

27. The wheel alignment apparatus for determining vehicle wheel alignment parameters as set forth in claim 26 wherein the video cameras are disposed to view opposite sides of the vehicle, at least one of said wheel targets being in a field of view of the said first video camera and at least one of said wheel targets being in a field of view of the second video camera.

28. The wheel alignment apparatus for determining vehicle wheel alignment parameters as set forth in claim 26 wherein at least two of the wheel targets are disposed in the field of view of the first video camera and at least two of the wheel targets are disposed in the field of view of the second video camera.

29. A method of calibrating wheel alignment apparatus having first and second fields of view, said method comprising the steps of:

disposing a first optical target in the first field of view and disposing a second optical target in the second field of view, said first and second optical targets being fixed with respect to each other;

obtaining a first image of the first optical target in the first field of view and obtaining a first image of the second optical target in the second field of view;

changing the location of the first optical target in the first field of view to a new location and changing the location of the second optical target in the second field of view to a new location without changing the locations of the first and second optical targets with respect to each other;

obtaining a second image of the first optical target in the first field of view at the new location and obtaining a second image of the second optical target in the second field of view at the new location; and determining from said images the relative alignment of the first field of view relative to the second field of view.

30. The method of calibrating wheel alignment apparatus as set forth in claim 29 wherein the first and second optical targets are fixedly disposed at the ends of a translatable member, said translatable member having a longitudinal axis, said step of changing the location of the first and second optical targets including translating the translatable member from a first translational position to a second translational position.

31. The method of calibrating wheel alignment apparatus as set forth in claim 30 wherein said step of disposing the first and second optical targets in the first and second fields of view includes disposing the translatable member in a fixture which rigidly aligns the first field of view with the second field of view.

32. The method of calibrating wheel alignment apparatus as set forth in claim 29 wherein the images in the first field of view are formed in a first video camera and the images in the second field of view are formed in a second video camera.

33. A method of checking the calibration of wheel alignment apparatus having first and second fields of view, said method comprising the steps of:

initially imaging a first optical target in the first field of view and imaging a second optical target in the second field of view, said first and second optical targets being fixed with respect to each other, and said imaging being made by at least one optical camera;

determining an initial distance between said first and second optical targets from said images of said first and second optical targets;

subsequently imaging the first and second optical targets and determining from their images a subsequent distance between said targets;

comparing the initial distance with the subsequent distance to determine whether the focal length of said at least one optical camera has changed.

* * * * *

UNITED STATES PATENT AND TRADEMARK OFFICE
CERTIFICATE OF CORRECTION

PATENT NO. : 5,724,128
DATED : March 3, 1998
INVENTOR(S) : Daniel B. January

It is certified that error appears in the above-indentified patent and that said Letters Patent is hereby corrected as shown below:

Column 14, line 41:

Therefore delete: "$Z_{LR} \quad Y_{LR} \quad Z_{LR} \quad 1$"

and insert: --- $X_{LR} \quad Y_{LR} \quad Z_{LR} \quad 1$ ---

Signed and Sealed this

Twenty-fifth Day of August, 1998

Attest:

BRUCE LEHMAN

*Attesting Officer*   *Commissioner of Patents and Trademarks*